United States Patent
Lin

(10) Patent No.: US 11,611,284 B2
(45) Date of Patent: Mar. 21, 2023

(54) ISOLATED SWITCHING POWER CONVERTER WITH MULTIPLE OUTPUTS

(71) Applicant: Dialog Semiconductor (UK) Limited, London (GB)

(72) Inventor: Yu-Chin Lin, Taipei (TW)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 17/344,281

(22) Filed: Jun. 10, 2021

(65) Prior Publication Data

US 2022/0399822 A1 Dec. 15, 2022

(51) Int. Cl.
*H02M 3/335* (2006.01)

(52) U.S. Cl.
CPC .............................. *H02M 3/33592* (2013.01)

(58) Field of Classification Search
None
See application file for complete search history.

(56) References Cited

U.S. PATENT DOCUMENTS

| | | | | |
|---|---|---|---|---|
| 7,400,063 B2 * | 7/2008 | Iwashita | ................ | H02H 3/023 307/31 |
| 7,768,801 B2 * | 8/2010 | Usui | ................. | H02M 3/33576 363/21.06 |
| 7,933,131 B2 * | 4/2011 | Cho | .................. | H02M 3/33561 323/267 |
| 9,729,068 B2 * | 8/2017 | Chen | .................... | H05B 45/382 |
| 10,015,849 B2 * | 7/2018 | Liu | ......................... | H02M 1/42 |
| 10,199,951 B2 * | 2/2019 | Kong | ................ | H02M 3/33592 |
| 2007/0176808 A1 * | 8/2007 | Osaka | ............... | H02M 3/33561 341/136 |

* cited by examiner

*Primary Examiner* — Jeffrey A Gblende
(74) *Attorney, Agent, or Firm* — Saile Ackerman LLC; Stephen B. Ackerman

(57) ABSTRACT

An isolated switching power converter is presented. The isolated switching converter includes a transformer, a secondary-side switch and a secondary-side controller. The transformer has a primary winding coupled to an input, a first secondary winding coupled to a first output for providing a first output voltage, and a second secondary winding coupled to a second output for providing a second output voltage. The secondary-side switch is coupled to the second secondary winding. The secondary-side controller compares the second output voltage with a first reference voltage and generates a control signal based on the comparison to operate the secondary-side switch.

18 Claims, 11 Drawing Sheets

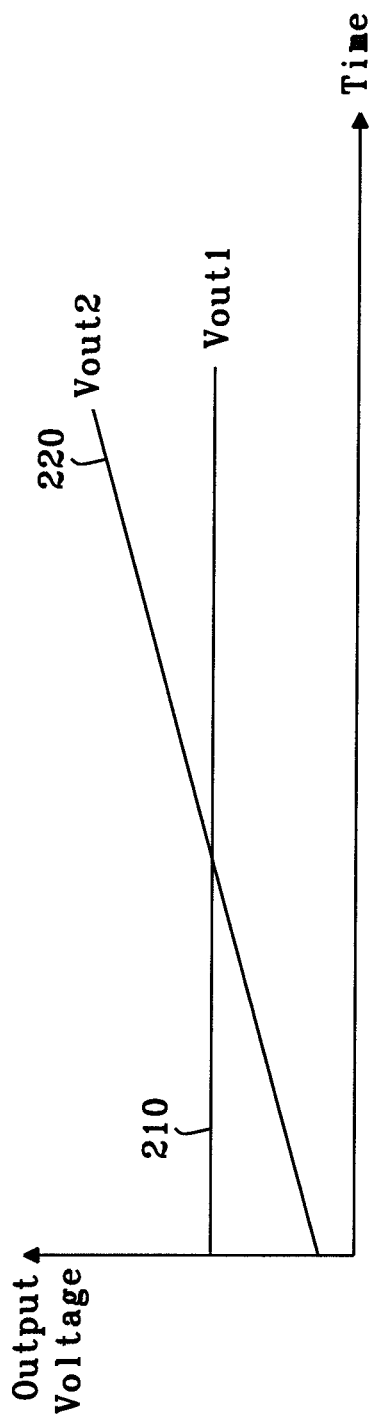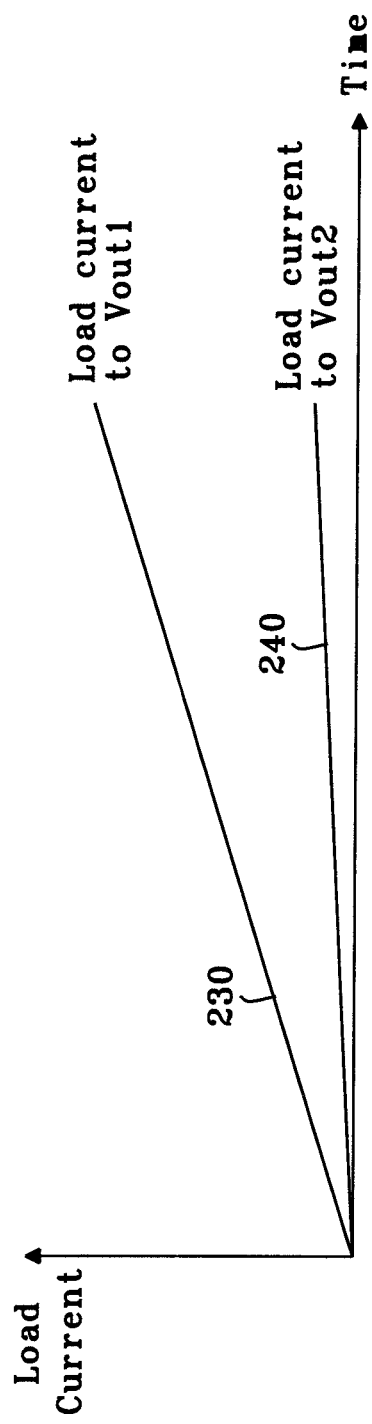
FIG. 2A Prior Art
FIG. 2B Prior Art

ISOLATED SWITCHING POWER CONVERTER WITH MULTIPLE OUTPUTS

TECHNICAL FIELD

The present disclosure relates to an isolated switching power converter and in particular to an isolated switching power converter having multiple outputs.

BACKGROUND

Isolated switching power converters can be used to provide regulated power to an electronic device while providing galvanic isolation between the electronic device and an AC power source. Typically an isolated switching power converter includes a transformer which comprises a primary winding coupled with the AC power source and a secondary winding coupled with an output of the converter circuit. The transformer provides galvanic isolation, and components which are coupled with the primary winding are collectively referred to as the primary side of the power converter circuit, while components which are coupled with the secondary winding are collectively referred to as the secondary side of the power converter circuit. The output provides a regulated voltage for an output load. Isolated switching power converters can also be implemented with multiple outputs for powering two or more devices or electrical circuits. For instance two secondary windings can be used to deliver different outputs, for instance a relatively high power output referred to main output and a relatively low power output referred to as slave output.

SUMMARY

Multiple outputs isolated switching converters are often limited by cross regulation effects between output channels in which the output voltage of the slave channel varies with increased load current at the main channel. Various solutions have been proposed, including the addition of a post regulator on the slave channel which increases the footprint and complexity of the system. It is an object of the disclosure to address one or more of the above mentioned limitations.

According to a first aspect of the disclosure there is provided an isolated switching power converter comprising a transformer having a primary winding coupled to an input, a first secondary winding coupled to a first output for providing a first output voltage, and a second secondary winding coupled to a second output for providing a second output voltage; a secondary-side switch coupled to the second secondary winding; and a secondary-side controller adapted to compare the second output voltage with a first reference voltage and to generate a control signal based on the comparison to operate the secondary-side switch.

Optionally, the first and second secondary windings are designed such that the first output voltage is greater than the second output voltage.

Optionally, the secondary-side controller is adapted to turn the secondary-side switch on when the second output voltage is less than the first reference voltage, and to turn the secondary-side switch off when the second output voltage is equal or greater than the first reference voltage.

Optionally, the secondary-side controller is adapted to compare a winding voltage at the second secondary winding with a second reference voltage and to turn the secondary-side switch on when both the second output voltage is less than the first reference voltage and the winding voltage is greater than the second reference voltage.

For instance, the first reference voltage and the second reference voltage may be pre-set constant values. The second voltage may be set to be equal or greater than the first reference voltage.

Optionally, the secondary-side controller comprises a first comparator adapted to compare the second output voltage with the first reference voltage.

Optionally, the secondary-side controller comprises a second comparator adapted to compare the winding voltage with the second reference voltage.

Optionally, the secondary-side controller comprises a driver coupled to a logic gate adapted to receive outputs from the first comparator and the second comparator.

For instance, the logic gate may be an AND gate having a first input to receive the output of the first comparator and a second input to receive the output of the second comparator.

Optionally, the secondary-side controller comprises a timer adapted to set an on-time of the secondary-side switch.

Optionally, the secondary-side switch is coupled to the second secondary winding via a diode.

Optionally, the secondary-side switch is coupled to the second secondary winding via another switch.

Optionally, the secondary-side switch is a first transistor and the said another switch is a second transistor.

Optionally, the first transistor has a source terminal coupled to the source terminal of the second transistor.

Optionally, the first transistor has a drain terminal coupled to the drain terminal of the second transistor.

Optionally, the isolated switching power converter comprises an energy storing device for powering the secondary-side controller.

For instance, the energy storing device may be a capacitor.

Optionally, the first output is coupled to the secondary-side controller.

Optionally, the isolated switching power converter comprises a primary-side switch coupled to the primary winding, and a primary-side controller adapted to control the primary-side switch.

Optionally, the second secondary winding, the secondary-side switch and the secondary side controller form an output channel circuit and wherein the isolated switching power converter comprises a plurality of output channel circuits.

According to a second aspect of the disclosure, there is provided a method of regulating an output of an isolated switching power converter, the method comprising:

providing an isolated switching power converter comprising a transformer having a primary winding coupled to an input, a first secondary winding coupled to a first output for providing a first output voltage, and a second secondary winding coupled to a second output for providing a second output voltage, and a secondary-side switch coupled to the second secondary winding;

comparing the second output voltage with a first reference voltage and generating a control signal based on the comparison to operate the secondary-side switch.

Optionally, the method comprises turning the secondary-side switch on when the second output voltage is less than the first reference voltage, and turning the secondary-side switch off when the second output voltage is greater than the first reference voltage.

Optionally, the method comprises comparing a winding voltage at the second secondary winding with a second reference voltage and turning the secondary-side switch on when both the second output voltage is less than the first reference voltage and the winding voltage is greater than the second reference voltage.

The method according to the second aspect may share features of the first and aspect, as noted above and herein.

BRIEF DESCRIPTION OF THE DRAWINGS

The disclosure is described in further detail below by way of example and with reference to the accompanying drawings, in which:

FIGS. 2A and 2B are plots illustrating cross coupling effects between two output channels in the converter of FIG. 1;

DESCRIPTION

Figure 1:
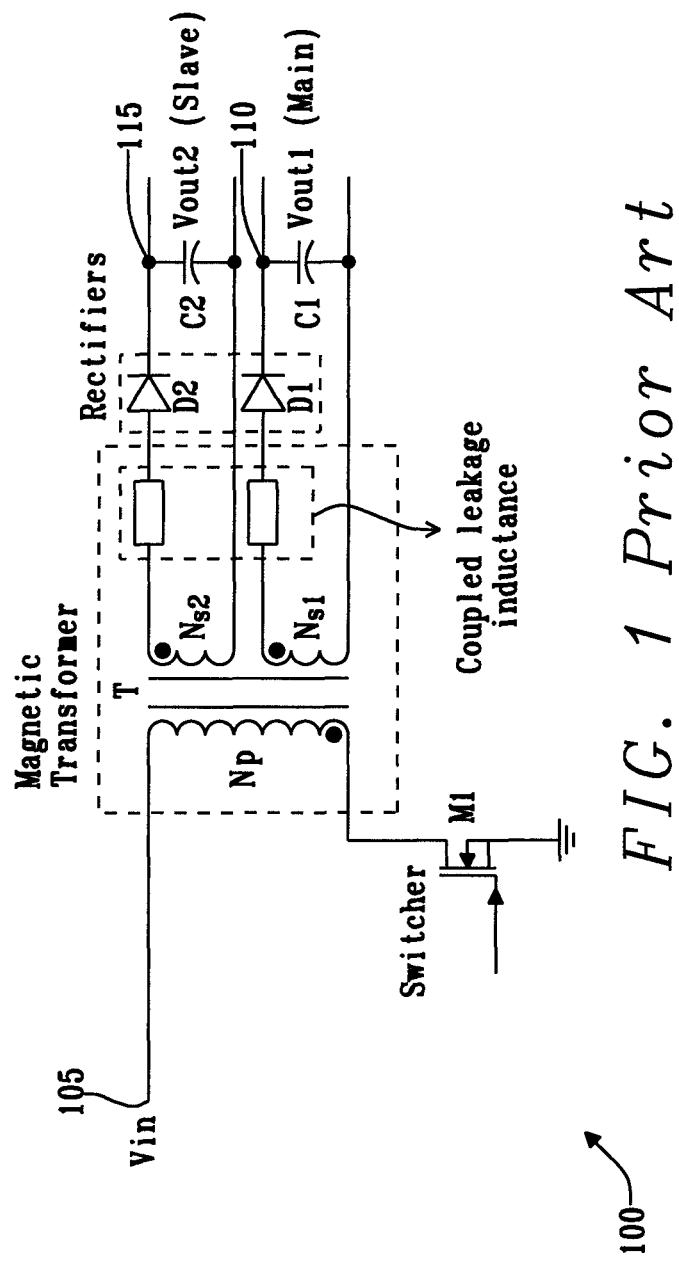
FIG. 1 is a diagram of a conventional multiple outputs isolated switching converter.

FIG. 1 illustrates a conventional isolated switching converter 100 with multiple outputs. The power converter 100 has an input 105 for receiving an input voltage Vin and two outputs 110 and 115 for providing a first output voltage Vout1 and a second output Vout2, respectively. The input voltage Vin is typically a DC voltage which may be fixed to a particular value. The power converter 100 includes a transformer T having a primary winding $N_P$ and two secondary winding $N_{S1}$ and $N_{S2}$. A switch M1 couples the primary winding $N_P$ to ground. The switch M1 has a control terminal coupled to a primary side switch controller (not shown). The secondary windings $N_{S1}$ and $N_{S2}$ are each connected to a dedicated rectifier diode D1 and D2, respectively. A first output capacitor C1 is provided between the output 110 and a first ground. Similarly a second output capacitor is provided between the output 115 and a second ground.

The first output voltage Vout1 is referred to as the main voltage while the second output Vout2 is referred to as the slave voltage. For instance for a total output power of 60W the first output (main channel) may provide 50W and the second output (slave channel) may provide 10W.

The primary-side swich M1 is used to control the delivery of energy to the first and second outputs 110 and 115. When the primary-side switch M1 is on (closed), the primary winding $N_P$ is connected with the input voltage source and a current is generated in the primary winding. As a result energy builds up and is stored in the transformer. The voltage across the secondary winding $N_{S1}$ is negative and the diode D1 is reversed biased. Similarly the voltage across the secondary winding $N_{S2}$ is negative and the diode D2 is reversed biased. In this state energy is supplied to the first and second outputs via the output capacitors C1 and C2. When M1 is turned off (open), the energy stored in primary winding $N_P$ is released to the secondary windings $N_{S1}$ and $N_{S2}$. The diodes D1 and D2 become forward biased enabling transfer of energy stored in transformer T to the outputs 110 and 115 and re-charging the output capacitors C1 and C2.

Such a circuit is limited by coupled leakage inductance between the secondary windings $N_{S1}$ and $N_{S2}$. This results in a wide range of voltage variations at the slave output as the load on the main channel changes.

FIGS. 2A and 2b are plots showing the variation of the second output voltage (slave) Vout2 for increasing load currents applied to the first output. The main output voltage Vout1 210 remains stable, however the slave output voltage Vout2 220 increases along with the load current 230 applied to the first output. Various circuit modifications have been proposed to minimize such cross-regulation effects.

Figure 3:
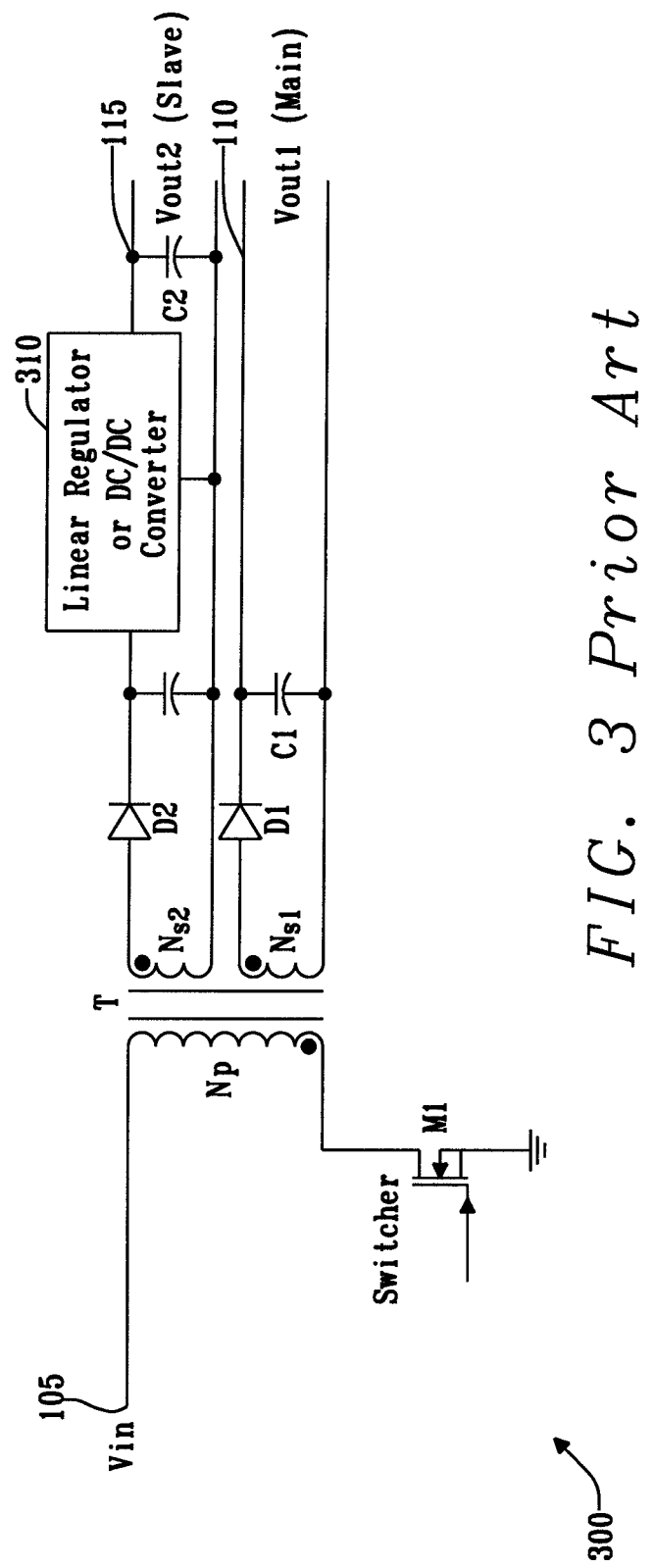
FIG. 3 is a diagram of a multiple outputs isolated switching converter provided with a post regulator.

FIG. 3 illustrates an isolated switching converter provided with a post regulator. The isolated switching converter 300 is similar to the converter 100 and the same reference numerals have been used to indicate corresponding components. In this circuit a linear regulator or a DC-DC converter 310 is provided after the diode D2 on the slave channel to regulate the output voltage Vout2. This approach increases the size and design complexity of the circuit.

Figure 4:
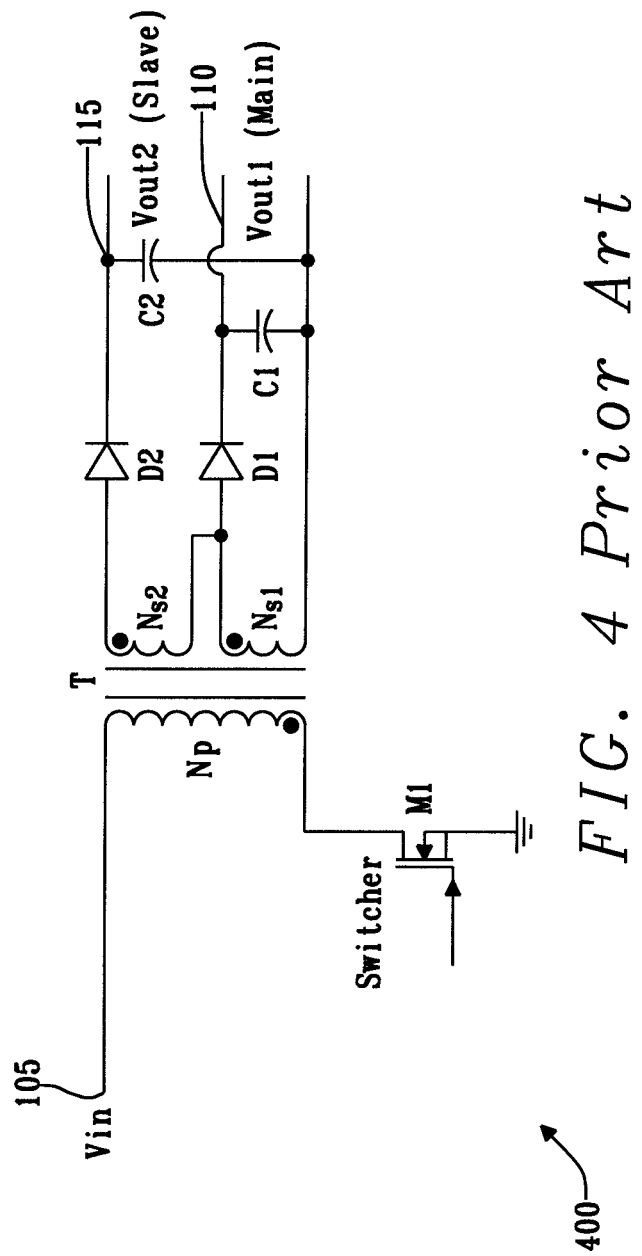
FIG. 4 is a diagram of another multiple outputs isolated switching converter according to the prior art.

FIG. 4 illustrates another modified isolated switching converter. The isolated switching converter 400 is similar to the converter 100 and the same reference numerals have been used to indicate corresponding components. In this example the secondary windings $N_{S1}$ and $N_{S2}$ are connected to each other. The first output capacitor C1 and the second output capacitor C2 are both connected to a same ground. This approach only provides limited cross regulation improvements and the requirement for a common ground limits the range of applications for which the circuit can be used.

Figure 5:
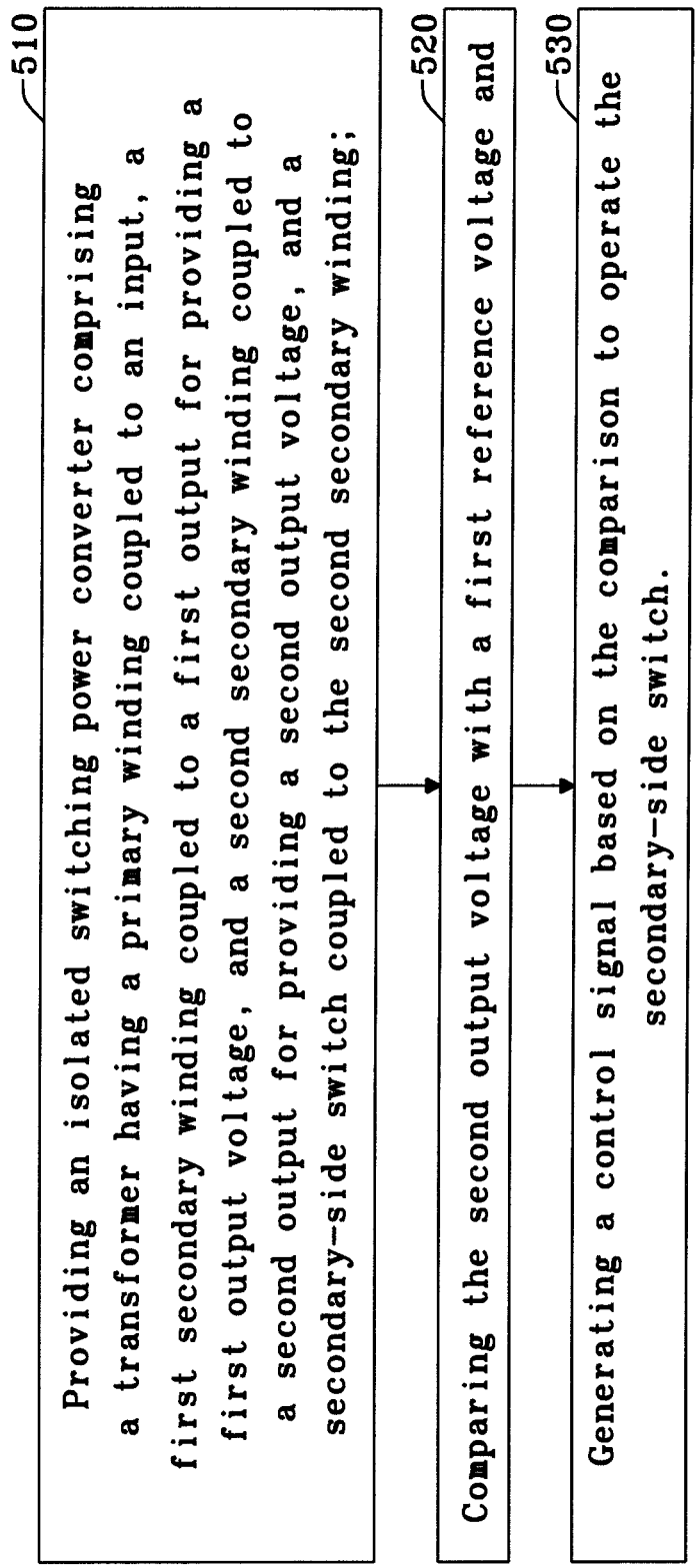
FIG. 5 is a flow chart of a method for regulating an output of an isolated switching power converter according to the disclosure.

FIG. 5 is a flow chart of a method for regulating an output of an isolated switching power converter according to the disclosure. At step 510 an isolated switching power converter is provided. The isolated switching power converter comprises a transformer having a primary winding coupled to an input, a first secondary winding coupled to a first output for providing a first output voltage, a second secondary winding coupled to a second output for providing a second output voltage, and a secondary-side switch coupled to the second secondary winding. The primary and secondary windings may be designed such that the first output voltage is greater than the second output voltage. At step 520 the second output voltage is compared with a first reference voltage. The first reference voltage may be a predetermined pre-set value. At step 530 a control signal is generated based on the comparison to operate the secondary-side switch.

Using this approach permits the provision of an accurate second output voltage.

Figure 6:
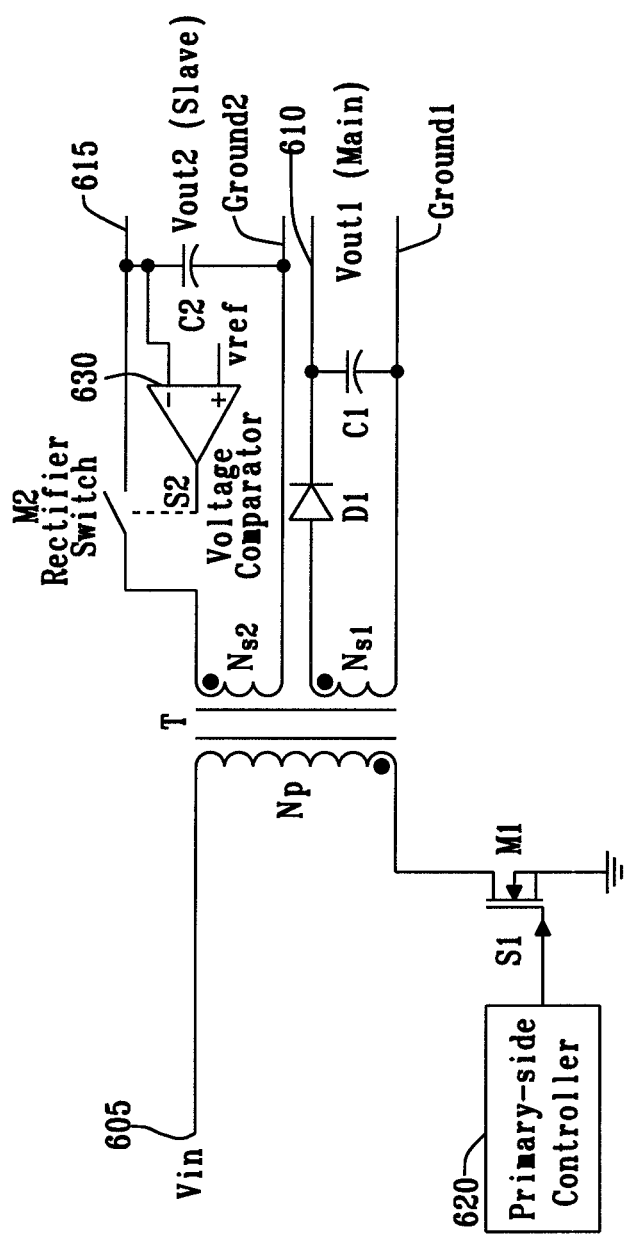
FIG. 6 is a diagram of an isolated switching power converter for implementing the method of FIG. 5.

FIG. 6 is a diagram of an isolated switching power converter for implementing the method of FIG. 5. The isolated switching converter 600 has an input 605 for receiving an input voltage Vin and two outputs 610 and 615 for providing a first output voltage Vout1 and a second output Vout2, respectively. The input voltage Vin is typically a DC voltage which may be fixed to a particular value. It will be appreciated that a suitable rectifier may be provided as part of an input stage of the power converter 600 to provide a fixed DC voltage Vin.

The first output voltage Vout1 also referred to as the main voltage may be greater than the second output voltage Vout2. For example, the main voltage Vout1 may be used to power a first device that requires significant power, while the second output Vout2 referred to as the slave voltage may be used to operate another device that requires a stable voltage such as a logic circuit or a central processing unit (CPU).

In a specific example the circuit may be designed to provide a main output voltage Vout1=20V and a slave output voltage Vout2=5V. In this case the ratio of the number of turns between the first and second windings could be Np/$N_{S1}$=100 turns/20 turns and Np/$N_{S2}$=100 turns/5 turns.

However it will be appreciated that the proposed circuit is not limited to particular values of main and slave voltages. The isolated switching power converter can be designed to operate as a step down converter (Vin>Vout) or as a step up converter (Vin<Vout).

A primary-side switch M1 couples the primary winding $N_P$ to ground. The switch M1 has a control terminal coupled to a primary-side controller 620. The isolated switching converter 600 includes a transformer T having a primary winding $N_P$ coupled to the input 605, a first secondary winding $N_{S1}$ coupled to the first output 610, and a second secondary winding $N_{S2}$ coupled to the second output 615. A secondary-side switch also referred to as rectifier switch M2 is coupled to the second secondary winding $N_{S2}$. A secondary-side controller 630 is provided to compare the second output voltage Vout with a first reference voltage VREF and to provide a control signal to operate the secondary-side switch M2.

The first secondary winding $N_{S1}$ is coupled to a rectifier diode D1. A first output capacitor C1 is provided between the first output 610 and a first ground. Similarly a second output capacitor C2 is provided between the second output 615 and a second ground. Depending on the application, the first ground and the second ground may be the same or different. For instance, the first ground may be an isolated ground and the second ground may be coupled to earth.

In operation the primary-side controller 620 generates a control signal S1 to turn the switch M1 on/off in each switching cycle. When the switch M1 is on (closed), the primary winding $N_P$ is connected with the input voltage source and a current is generated in the primary winding. Energy is stored in the primary winding $N_P$. The voltage across the secondary winding $N_{S1}$ is negative and the diode D1 is reversed biased. Similarly the voltage across the secondary winding $N_{S2}$ is negative and the diode D2 is reversed biased. In this state energy is supplied to the first and second outputs via the output capacitors C1 and C2. When M1 is turned off (open), the energy stored in primary winding $N_P$ is released to the secondary windings $N_{S1}$ and $N_{S2}$. The diodes D1 and D2 become forward biased enabling transfer of energy stored in transformer T to the outputs 610 and 615 and re-charging the output capacitors C1 and C2. The particular timings to switch M1 on and off of $t_{ON}$ are determined by the control scheme (for example, pulse width modulation PWM or pulse-frequency modulation PFM) employed in the switching power converter 600.

The secondary-side controller 630 monitors the output voltage Vout2 and generates a control signal S2 to control the switch M2. The control signal S2 is configured to turn the switch M2 on (closed) when the second output voltage Vout2 is less than the first reference voltage VREF, and to turn the switch M2 off (open) when the second output voltage Vout2 is equal or greater than VREF.

The power converter 600 permits to suppress cross regulation and provide an accurate output voltage Vout2 with a simple circuit design. There is no need for an additional post-regulator circuit.

It will be appreciated that circuit 600 may be modified to provide a plurality of slave outputs VoutN. The second secondary winding $N_{S2}$, the secondary-side switch M2 and the secondary side controller 630 form an output channel circuit and the isolated switching power converter may comprises a plurality of output channel circuits.

Figure 7:
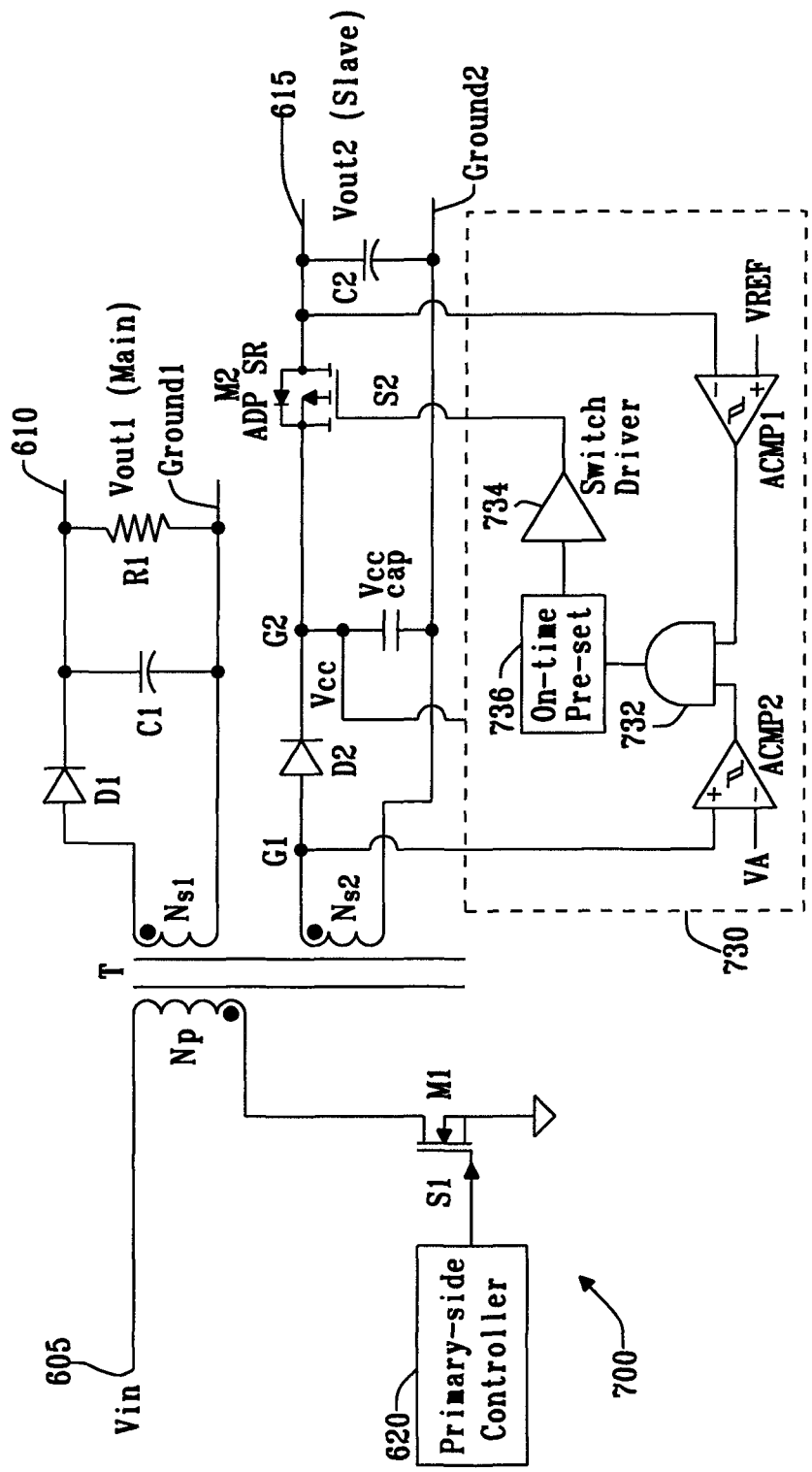
FIG. 7 is a diagram of another isolated switching power converter for implementing the method of FIG. 5.

FIG. 7 shows another isolated switching power converter for implementing the method of FIG. 5. FIG. 7 shares many similar components to those illustrated in FIG. 6. The same reference numerals have been used to represent corresponding components and their description will not be repeated for sake of brevity.

The main channel providing Vout1 is similar to the one described in FIG. 6. The first secondary winding $N_{S1}$ is coupled to a rectifier diode D1. A first output capacitor C1 and a first resistance R1 are provided in parallel between the first output 610 and a first ground.

The slave channel providing Vout2 includes a rectifier switch M2, also referred to as adaptive rectifier switch ADP_SR, coupled to a secondary-side controller 730. In this example the switch M2 is implemented as a P-type metal oxide field effect transistor MOSFET, however it will be appreciated M2 could also be a N-type MSOFET or a bipolar junction transistor BJT and the circuit adapted accordingly. A reservoir capacitor Vcc_cap coupled to the controller 730 is provided to power the controller 730. The capacitor Vcc_cap may have a small capacitance that is sufficient to provide a rectified DC voltage Vcc to the controller 730. For instance, the capacitance of Vcc_cap may be two or three orders of magnitude smaller than the capacitance of the output capacitor C2.

The second secondary winding $N_{S2}$ has a first terminal coupled to the second output 615 via a second diode D2 in series with the rectifier switch M2, and a second terminal coupled to a second ground. An output capacitor C2 is provided between the second output 615 and the second ground. The capacitor Vcc_cap has a first terminal coupled to node G2 (between D2 and M2) and a second terminal coupled to the second ground.

The secondary-side controller 730 includes two comparators ACMP1 and ACMP2, an AND gate 732, and a driver 734 coupled to the control terminal of the rectifier switch M2. The first comparator ACMP1 has a first input, for instance an inverting input coupled to the second output 615 and a second input, for instance a non-inverting input for receiving a reference voltage VREF.

The second comparator ACMP2 has a first input, for instance a non-inverting input coupled to the first terminal of the second secondary winding $N_{S2}$ at node G1 and a second input, for instance an inverting input for receiving a second reference voltage VA.

The first reference voltage VREF and the second reference voltage VA may be pre-set constant values. For instance, the voltage VA may be set to be equal or slightly higher than VREF. The reference voltage VA may be set as a threshold value above which the diode D2 is forward biased, such that the rectifier switch M2 can only be turned on during a period when the diode D2 is forward biased (see periods between the times t1 and t2, or between t4 and t5 in FIG. 8 below).

The AND gate 732 has a first input for receiving the output of the first comparator ACMP1 and a second output for receiving the output of the second comparator ACMP2. The output of the AND gate is coupled to the driver 734. Optionally, a timer circuit 736 may be provided at the input of the driver 734 to set the on-time of the secondary-side switch M2 to a pre-determined duration.

In operation the secondary-side controller 730 compares the output voltage Vout2 with a first reference VREF using the comparator ACMP1 and compares the winding voltage of the secondary-side winding $N_{S2}$ with the second reference voltage VA using the comparator ACMP2.

When Vout2 is less than VREF and when the secondary-side winding voltage is greater than VA, both comparators ACMP1 and ACMP2 provide a high signal (logic 1). As a result the AND gate outputs a high logic signal to the driver 734 which generates the control signal S2 to turn the rectifier switch M2 on. The on-time duration of M2 is controlled by the timer circuit 736. When the AND gate 732 receives a low signal (logic 0) from at least one of the comparator ACMP1 and the comparator ACMP2, then the output of the AND gate is low (logic zero) and the switch M2 is turned off (open) or remains off.

The comparator ACMP2 therefore provides an enable function for enabling a potential activation of the switch M2 during a limited time period and preventing activation outside of this time period, for instance while the primary switch turns on or after the magnetic flux has fully discharged. Stated another way the circuit 730 can be disabled when the comparator ACMP2 outputs a logic low, hence saving energy by reducing Vcc consumption. Therefore this circuit removes the cross-regulation between output channels while maintaining the converter efficiency. This is achieved without unduly increasing the complexity of the system.

Figure 8:
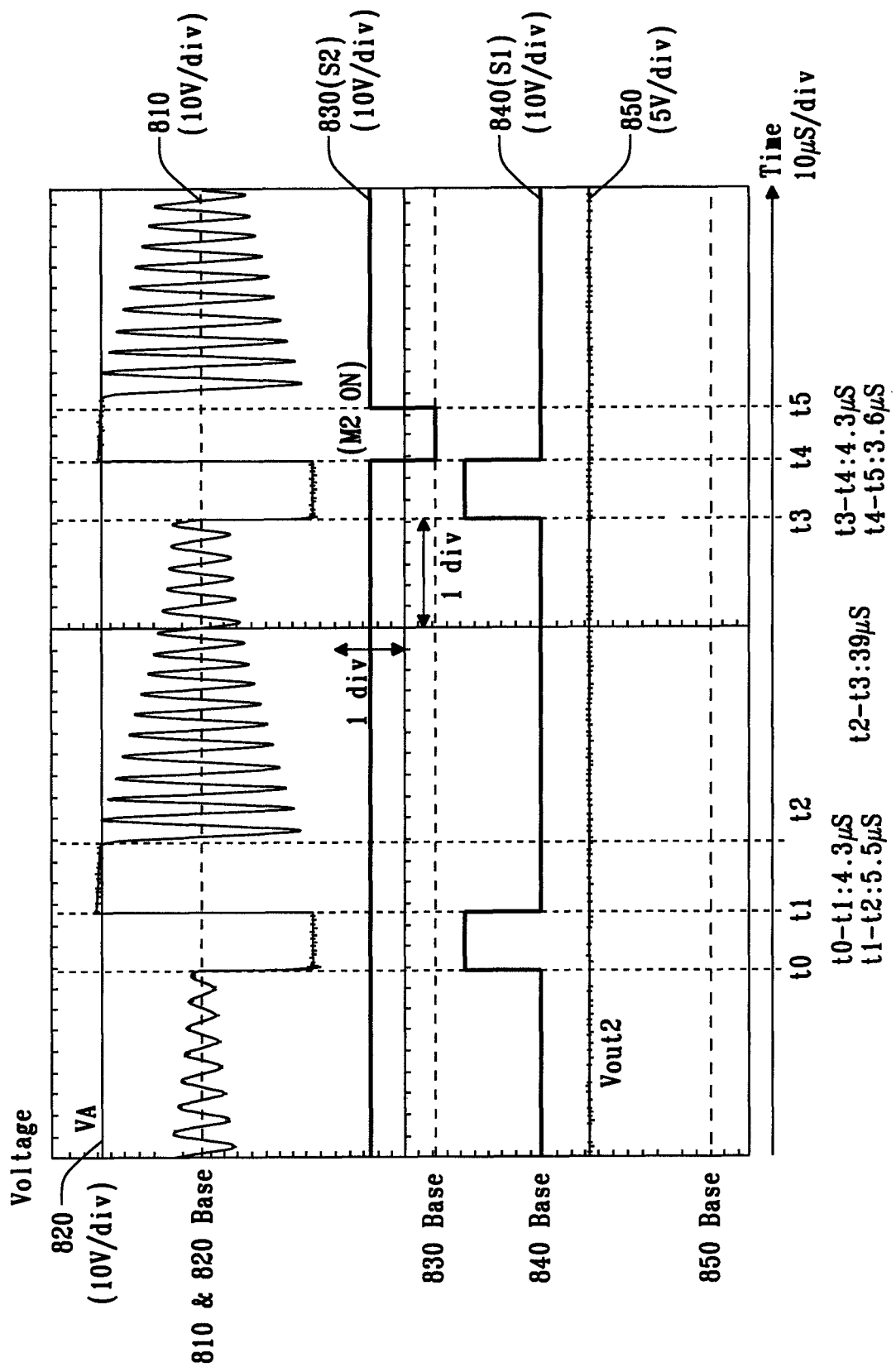
FIG. 8 is a simulation diagram illustrating the working of the circuit of FIG. 7.

FIG. 8 is a simulation diagram illustrating the working of the circuit of FIG. 7. The diagram shows the voltage 810 of the second secondary winding $N_{S2}$, the reference voltage VA 820, the control signal S2 830 for operating the rectifier switch M2, the control signal S1 840 for operating the switch M1 and the output voltage Vout2 850.

Between the time t0 and t1 the control signal S1 840 provided by the primary side controller 620 is high and the switch M1 is turned on (closed). The control signal S2 830 provided by the secondary-side controller 730 is high and the switch M2 is off (open). The winding voltage 810 remains constant and negative.

At time t1 the switch M1 is switched off and the voltage 810 starts increasing. The energy stored in primary winding $N_P$ is released to the secondary windings $N_{S1}$ and $N_{S2}$. The diodes D1 and D2 become forward biased enabling transfer of energy stored in transformer T to the outputs 610 and 615 and re-charging the output capacitors C1 and C2.

The duration between the times t1 and t2 is referred as the transformer reset period (discharging flux) for resetting the transformer core. During the transformer reset period, the diode D2 conducts (forward biased) and the voltage across the secondary winding $N_{S2}$ is almost equals the output voltage Vout2 (V(Ns2)=forward voltage-drop across diode D2+Vout2). Between the initial rise and fall the voltage 810 remains approximately constant. While D2 in forward-bias the winding voltage 810 charges the reservoir capacitor Vcc cap and also supplies power to the circuit 730 regardless of whether the switch M2 is on or off. In this example between t1 and t2 the winding voltage 810 goes above the reference voltage VA but the voltage Vout2 is still above the voltage reference VREF. As a result, the control signal S2 830 remains high and the rectifier switch M2 remains off.

At the end of the reset period at time t2, the diode D2 stops conducting causing resonance effects referred to as transformer ringing. The transformer ringing comprises a decaying sinusoidal signal. Between the times t2 to t3, the switch M1 is off (open), the diodes D1 and D2 are reversed bias, and the switch M2 is off (open). The transformer ringing oscillations occur naturally by a resonate tank formed of the transformer primary inductance and the parasitic capacitance of the switch M1 and primary winding. While D2 is reverse-bias, the circuit 730 is powered by Vcc cap and optionally by the output capacitor C2 if the Vcc cap voltage drops below Vout2-Vd in which Vd is the forward voltage of M2 body diode.

At time t3 the switch M1 is turned back on and a new switching cycle starts again.

At time t4, the winding voltage goes above the reference voltage VA while the voltage Vout2 decreases below the voltage reference VREF (not visible in FIG. 8 as the decrease is small). As a result the control signal S2 830 goes low and the rectifier switch M2 is turned on to maintain Vout 2 to the desired level. By turning the rectifier switch M2 fully on for an on-time period (between t4 and t5) the output capacitor C2 is replenished while the output voltage Vout2 drops below VREF.

Figures 9A, 9B:
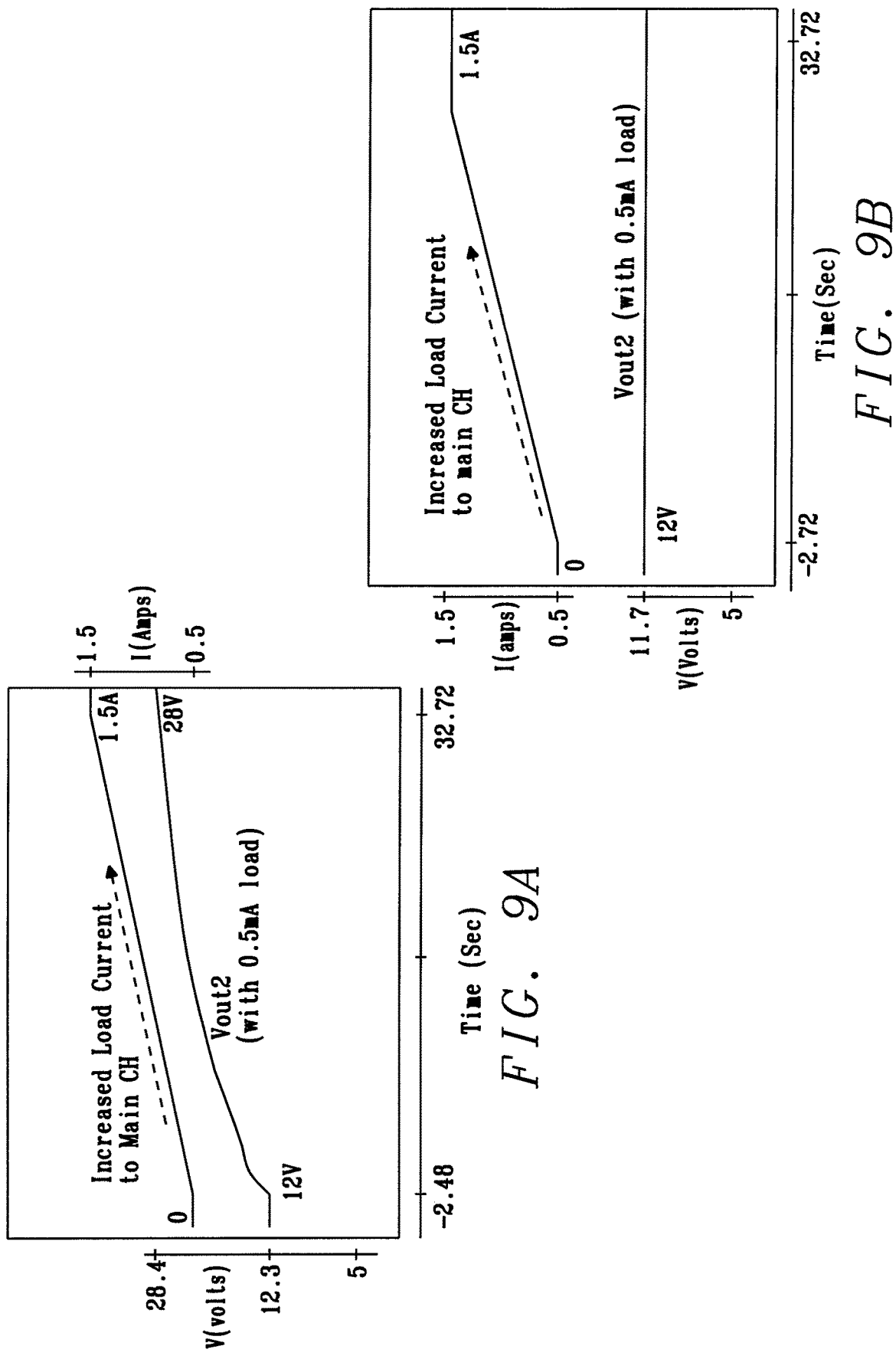
FIG. 9A is a simulation showing the variations of the slave output voltage as a function of increased load current at the main channel for the circuit of FIG. 1.
FIG. 9B is a simulation showing the output voltages of the slave output voltage as a function of increased load current at the main channel for the circuit of FIG. 7.

FIG. 9A is simulation diagram showing the output voltages Vout2 and the load current at the main output for the prior art circuit of FIG. 1. As the load current at the main channel increases from 0 A up to 1.5 A, the output voltage Vout2 increases from 12V to 28V.

FIG. 9B is simulation diagram showing the output voltages Vout2 and the load current at the main output for the circuit of FIG. 7. As the load current at the main channel increases from 0 A up to 1.5 A, the output voltage Vout2 remains constant at 12V.

Figure 10:
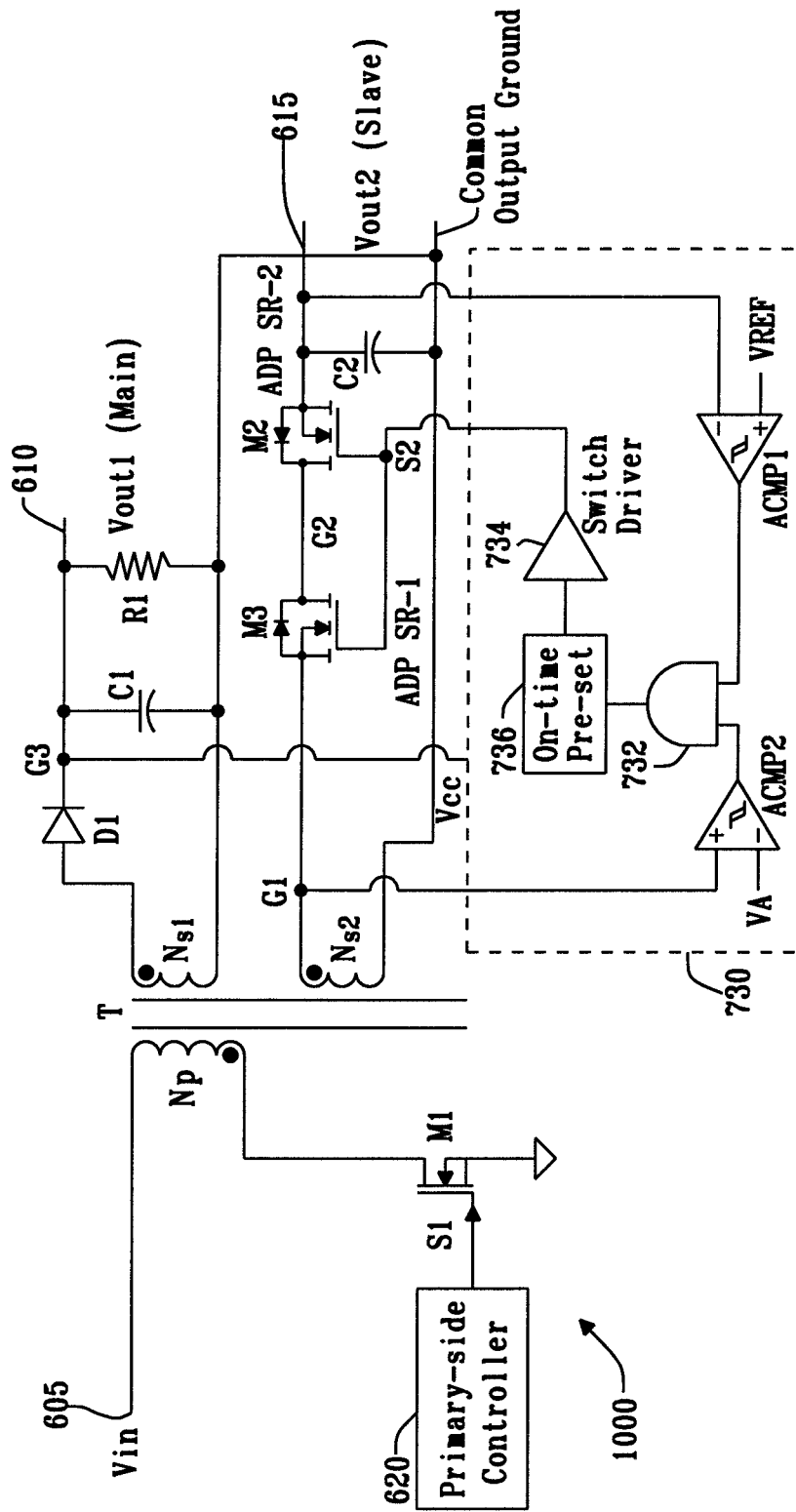
FIG. 10 is a diagram of another isolated switching power converter for implementing the method of FIG. 5.

FIG. 10 shows another isolated switching power converter for implementing the method of FIG. 5. The power converter 1000 shares many similar components to those illustrated in the circuit 700 of FIG. 7. The same reference numerals have been used to represent corresponding components and their description will not be repeated for sake of brevity.

In this implementation, the diode D2 has been replaced by another rectifier switch M3 and the Vcc capacitor has been removed. Instead, a connection is provided between the first output 610 at node G3 and the controller 730. The first channel (main channel) and the second channel (slave channel) share a common ground.

The rectifier switches M2 and M3 are coupled in a back to back configuration and are both operated by the controller 730. The switch M2 has a first (control) terminal for example a gate terminal coupled to the output of the controller 730, a second terminal for example a source terminal coupled to the output 615, and a third terminal for example a drain terminal coupled to node G2. The switch M3 has a first (control) terminal for example a gate terminal coupled to the output of the controller 730, a second terminal for example a source terminal coupled to the secondary winding $N_{S2}$ at node G1, and a third terminal for example a drain terminal coupled to node G2. So when the M2 and M3 are implemented with FET transistors the drain of M2 is coupled to the drain of M3. In this example the switches M2 and M3 are both implemented as N-type MOSFETS but other types of transistors could be envisaged.

Current losses through a transistor switch are much less than through a diode, therefore by replacing the diode D2 by a rectifier switch M3, losses are reduced, and the efficiency of the circuit is improved. The circuit also does not require the reservoir capacitor Vcc_cap. However, in this case the main channel and the slave channel must share a common ground.

Figure 11:
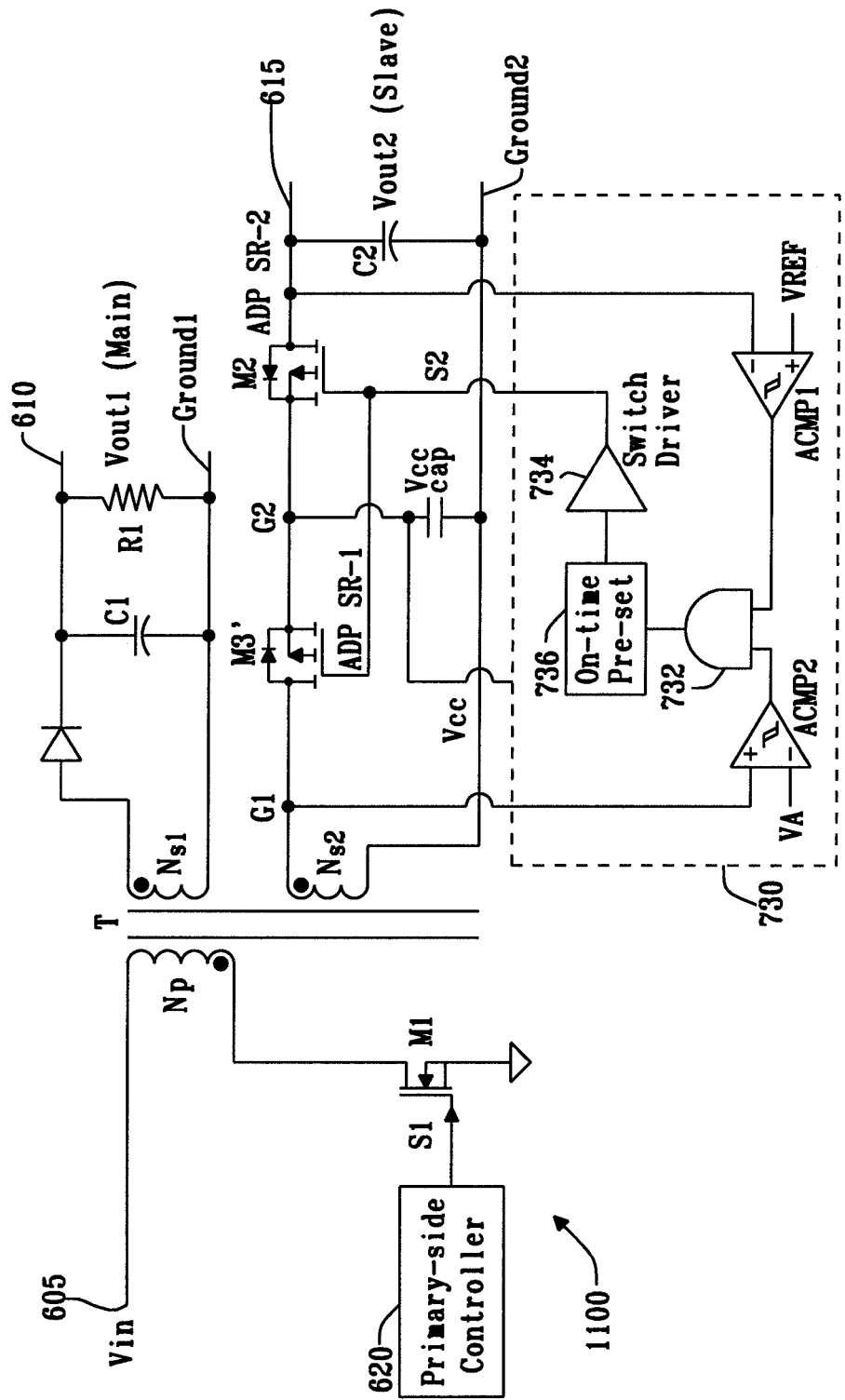
FIG. 11 is a diagram of yet another isolated switching power converter for implementing the method of FIG. 5.

FIG. 11 shows another isolated switching power converter for implementing the method of FIG. 5. The power converter 1100 shares many similar components to those illustrated in the circuit 700 of FIG. 7. The same reference numerals have been used to represent corresponding components and their description will not be repeated for sake of brevity.

In this implementation, the diode D2 has been replaced by another switch M3'. In this example the switches M2 and M3' are both implemented as P-type MOSFETS but other types of transistors could be envisaged. The switch M2 has a first (control) terminal for example a gate terminal coupled to the output of the controller 730, a second terminal for example a source terminal coupled to node G2, and a third terminal for example a drain terminal coupled to the output 615. The switch M3' has a first (control) terminal for example a gate terminal coupled to the output of the controller 730, a second terminal for example a source terminal coupled to node G2, and a third terminal for example a drain terminal coupled to the secondary winding secondary winding $N_{S2}$ at node G1. So when the M2 and M3' are implemented with FET transistors the source of M2 is coupled to the source of M3. When the switch M3' is off it's body diode provides the same function as the diode D2 in FIG. 7, hence allowing charging the reservoir capacitor Vcc_cap.

In this embodiment, the efficiency of the circuit is improved and the output channels (both main and slave) can be implemented with two different grounds if required.

It will be appreciated that the general concept of the description could be extended to isolated switching converters having more than two output channels. For instance, the isolated switching converter of the disclosure could be implemented with three or four output channels or more generally N output channels (with N>2). For example, an isolated switching converter may be implemented with one main channel and a plurality of slave channels.

A skilled person will appreciate that variations of the disclosed arrangements are possible without departing from the disclosure. Accordingly, the above description of the specific embodiment is made by way of example only and not for the purposes of limitation. It will be clear to the skilled person that minor modifications may be made without significant changes to the operation described.

What is claimed is:

1. An isolated switching power converter comprising
   a transformer having a primary winding coupled to an input, a first secondary winding coupled to a first output for providing a first output voltage, and a second secondary winding coupled to a second output for providing a second output voltage;
   a secondary-side switch coupled to the second secondary winding; and
   a secondary-side controller adapted to compare the second output voltage with a first reference voltage and to generate a control signal based on the comparison to operate the secondary-side switch;
   wherein the secondary-side controller is adapted to compare a winding voltage at the second secondary winding with a second reference voltage and to turn the secondary-side switch on when both the second output voltage is less than the first reference voltage and the winding voltage is greater than the second reference voltage.

2. The isolated switching power converter as claimed in claim 1, wherein the first and second secondary windings are designed such that the first output voltage is greater than the second output voltage.

3. The isolated switching power converter as claimed in claim 1, wherein the secondary-side controller is adapted to turn the secondary-side switch off when the second output voltage is equal or greater than the first reference voltage.

4. The isolated switching power converter as claimed in claim 1, wherein the secondary-side controller comprises a first comparator adapted to compare the second output voltage with the first reference voltage.

5. The isolated switching power converter as claimed in claim 4, wherein the secondary-side controller comprises a second comparator adapted to compare the winding voltage with the second reference voltage.

6. The isolated switching power converter as claimed in claim 5, wherein the secondary-side controller comprises a driver coupled to a logic gate adapted to receive outputs from the first comparator and the second comparator.

7. The isolated switching power converter as claimed in claim 6, wherein the secondary-side controller comprises a timer adapted to set an on-time of the secondary-side switch.

8. The isolated switching power converter as claimed in claim 1, wherein the secondary-side switch is coupled to the second secondary winding via a diode.

9. The isolated switching power converter as claimed in claim 1, wherein the secondary-side switch is coupled to the second secondary winding via another switch.

10. The isolated switching power converter as claimed in claim 9, wherein the secondary-side switch is a first transistor and the said another switch is a second transistor.

11. The isolated switching power converter as claimed in claim 10, wherein the first transistor has a source terminal coupled to a source terminal of the second transistor.

12. The isolated switching power converter as claimed in claim 10, wherein the first transistor has a drain terminal coupled to a drain terminal of the second transistor.

13. The isolated switching power converter as claimed in claim 1, comprising an energy storing device for powering the secondary-side controller.

14. The isolated switching power converter as claimed in claim 1, wherein the first output is coupled to the secondary-side controller.

15. The isolated switching power converter as claimed in claim 1, comprising a primary-side switch coupled to the primary winding, and a primary-side controller adapted to control the primary-side switch.

16. The isolated switching power converter as claimed in claim 1, wherein the second secondary winding, the secondary-side switch and the secondary side controller form an output channel circuit and wherein the isolated switching power converter comprises a plurality of output channel circuits.

17. A method of regulating an output of an isolated switching power converter, the method comprising
   providing an isolated switching power converter comprising a transformer having a primary winding coupled to an input, a first secondary winding coupled to a first output for providing a first output voltage, and a second secondary winding coupled to a second output for providing a second output voltage, and a secondary-side switch coupled to the second secondary winding;
   comparing the second output voltage with a first reference voltage and generating a control signal based on the comparison to operate the secondary-side switch;

comparing a winding voltage at the second secondary winding with a second reference voltage and turning the secondary-side switch on when both the second output voltage is less than the first reference voltage and the winding voltage is greater than the second reference voltage.

18. The method as claimed in claim 17, comprising turning the secondary-side switch off when the second output voltage is greater than the first reference voltage.

* * * * *